UNITED STATES PATENT OFFICE.

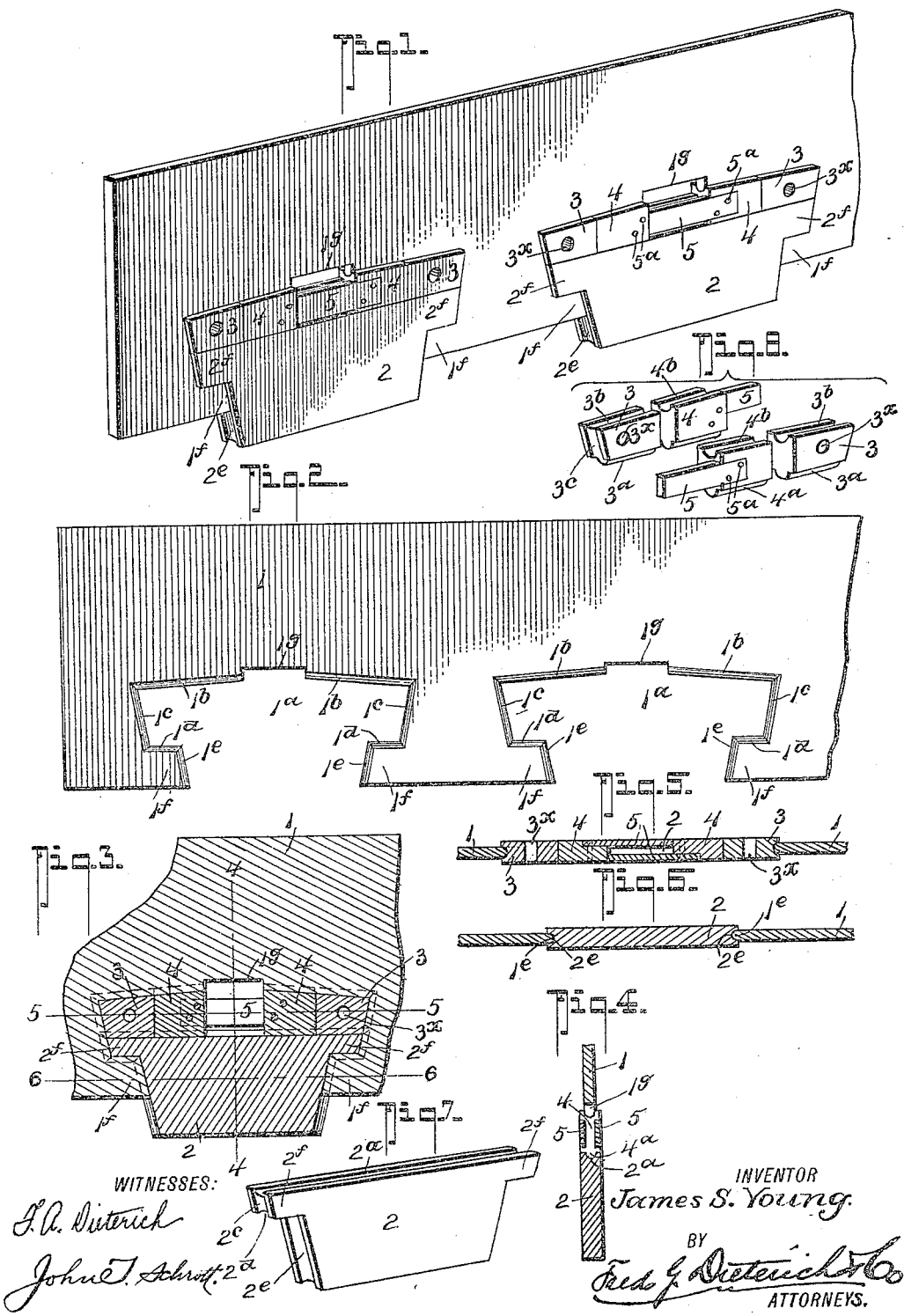

JAMES SYLVESTER YOUNG, OF BETHEL, VERMONT, ASSIGNOR TO HARRIET M. YOUNG, TRUSTEE FOR MAURICE D. YOUNG.

STONE-CUTTING SAW.

No. 816,769.  Specification of Letters Patent.  Patented April 3, 1906.

Application filed November 27, 1905. Serial No. 289,216.

*To all whom it may concern:*

Be it known that I, JAMES SYLVESTER YOUNG, residing at Bethel, in the county of Windsor and State of Vermont, have invented certain new and useful Improvements in Stone-Cutting Saws, of which the following is a specification.

My present invention relates to certain new and useful improvements in stone-cutting saws and the like, and it more particularly relates to improvements in insertible-tooth saws in which means are provided for removably securing the teeth to the blade, so they can be removed at will to change teeth whenever it may be found desirable to do so.

Generically my invention includes a saw-blade having approximately T-shaped recesses in its edge, into which the saw-teeth are inserted, such teeth and saw-recesses having groove-and-tongue connection on their adjacent faces and wedge devices inserted in the recesses for locking the teeth in place, such wedges having tongue-and-groove connection with the blade and with the teeth.

The invention also includes spring devices for holding the wedges in place.

In its more detailed character the invention comprises certain novel construction, combination, and arrangement of parts, all of which will be hereinafter first fully explained in detail and then be specifically pointed out in the appended claims.

My invention primarily has for its object to provide a saw of the aforementioned character of a very simple and effective construction and in which the teeth can be readily reinserted or removed and in which the inserted teeth can be firmly and positively locked in place.

Secondarily, my invention includes certain improvements on the type of saw disclosed in my copending application, filed on November 11, 1905, Serial No. 286,874.

Referring now to the accompanying drawings, Figure 1 is a perspective view of a blade embodying my invention. Fig. 2 is a side elevation of the blade. Fig. 3 is a vertical longitudinal section of a portion of the blade and tooth. Fig. 4 is a vertical cross-section on the line 4 4 of Fig. 3. Fig. 5 is a horizontal section on the line 5 5 of Fig. 3. Fig. 6 is a similar view on the line 6 6 of Fig. 3. Fig. 7 is a detail perspective view of a tooth. Fig. 8 is a similar view of the wedge devices for holding a tooth in place.

In the drawings, in which like numerals of reference indicate like parts in all of the figures, 1 designates the saw-blade, which is provided with a plurality of recesses $1^a$ in its lower edges, which recesses $1^a$ have their faces provided with semicircular tongues $1^b$ $1^b$ $1^c$ $1^c$, and the blade 1 is formed with inwardly-projected shoulders $1^f$ $1^f$ at the lower edge of the recesses $1^a$, which shoulders $1^f$ $1^f$ have faces formed with tongues $1^d$ $1^d$ and $1^e$ $1^e$, similarly to the tongues $1^b$ $1^c$, as clearly shown in Fig. 2.

The teeth 2 are substantially of a dovetailed form and have lateral shoulders $2^f$ $2^f$ to seat on the shoulders $1^f$ $1^f$ when the teeth are in place.

$2^a$ designates a groove in the upper face of the teeth 2 for a purpose presently understood, which teeth 2 have their sides provided with grooves $2^c$ $2^d$ $2^e$ to coöperate with the tongues $1^c$, $1^d$, and $1^e$ of the blade 1. The blades 1 also have supplemental plane-faced recesses $1^g$ in the upper edge of the recessed portions $1^d$ for a purpose presently explained.

The wedge devices in my present invention are made in separate parts and comprise the main wedge members 3 3, having apertures $3^\times$ to permit passage of a knocking bar or rod, and the locking-wedges 4 4, which carry the spring locking device 5 5, as shown. The main wedge members 3 3 have grooves $3^b$ $3^c$ to coöperate with the grooves $1^b$ $1^c$, respectively, of the blade 1, and they also have tongues $3^a$ to coöperate with the grooves $2^a$ in the tooth 2. The locking wedge members 4 have grooves $4^b$ to receive the tongues $1^b$ of the blade 1 and have tongues $4^a$ to enter the groove $2^a$ of the tooth 2. 5 designates a straight leaf-spring secured in a recess in the side of the locking-wedge 4 by pins or rivets $5^a$ $5^a$, and the spring 5 is of sufficient length to abut the opposite wedge 4 when the parts are in their normal position, as shown in Fig. 1. One or both of the wedges 4 may have the spring 5, if desired.

So far as described the manner in which my invention operates can be best explained as follows: The tooth is inserted into the aperture $1^a$ and dropped into position, after which the main wedges are inserted through the recess $1^g$ and driven home. The locking-wedges 4 4 are next inserted through the recess 1ᵍ and forced into engagement with the wedges 3 3 until the springs 5 5 spring into place and lock the wedges in their set position. To remove the tooth, it is only necessary to pry apart the springs 5 5 and withdraw the locking-wedges 4 4, after which the main wedges 3 3 can be driven out by moving them toward the center into the recess 1ᵍ clear of the tongues 1ʰ. The recess 1ᵍ affords an easy and quick way of inserting the wedges.

My invention possesses many novel and convenient features of improvement over those saws now in common use, all of which will be readily apparent to those skilled in the art and need not to be further dwelled upon in this specification.

What I claim is—

1. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedge in place, substantially as shown and described.

2. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedges in place, locking devices carried by said locking-wedges for interlocking the same, substantially as shown and described.

3. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedges in place, said blade having supplemental recesses, substantially as shown and described.

4. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedges in place, locking devices carried by said locking-wedges for interlocking the same, said blade having supplemental recesses substantially as shown and described.

5. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedges in place, said blade and said teeth having interlocking shoulders.

6. A saw comprising a blade having recesses in its lower edge, said blade being provided at said recesses with tongues, teeth detachably held in said recesses and having grooves to coöperate with said tongues, main wedges held in said recesses over the teeth and interlocking with the blade and teeth, and locking-wedges likewise held in said recesses for locking the main wedges in place, said blade having supplemental recesses, said blade and teeth having interlocking shoulders.

7. A saw comprising in combination with a blade having tooth-receiving recesses and shoulders projecting into said recesses, of shouldered teeth fitting within said recesses and interlocking with said blade, said teeth having their upper edges spaced from the upper edges of the recesses, and wedge devices held in said recesses above the teeth, substantially as shown and described.

8. A saw comprising in combination with a blade having tooth-receiving recesses and shoulders projecting into said recesses, of shouldered teeth fitting within said recesses and interlocking with said blade, said teeth having their upper edges spaced from the upper edges of the recesses, wedge devices held in said recesses above the teeth, supplemental wedges held in said recesses, and locking devices carried by said supplemental wedges, substantially as shown and described.

9. A saw comprising in combination with a blade having tooth-receiving recesses and shoulders projecting into said recesses, of shouldered teeth fitting within said recesses and interlocking with said blade, said teeth having their upper edges spaced from the upper edges of the recesses, wedge devices held in said recesses above the teeth, supplemental wedges held in said recesses, locking devices carried by said supplemental wedges, said blade having supplemental recesses merging with the first-mentioned recesses, substantially as shown and described.

JAMES SYLVESTER YOUNG.

Witnesses:
B. H. KIMBALL,
R. J. WHITCOMB.